United States Patent
Begon et al.

(10) Patent No.: US 7,941,608 B2
(45) Date of Patent: *May 10, 2011

(54) CACHE EVICTION

(75) Inventors: Florent Begon, Antibes (FR); Philippe Luc, Nice (FR); Elodie Charra, Antibe (FR); Nicolas Chaussade, Mouäns-Sartoux (FR)

(73) Assignee: ARM Limited, Cambridge (GB)

( * ) Notice: Subject to any disclaimer, the term of this patent is extended or adjusted under 35 U.S.C. 154(b) by 64 days.

This patent is subject to a terminal disclaimer.

(21) Appl. No.: 12/382,449

(22) Filed: Mar. 17, 2009

(65) Prior Publication Data

US 2009/0182949 A1 Jul. 16, 2009

Related U.S. Application Data

(63) Continuation of application No. 11/513,352, filed on Aug. 31, 2006, now Pat. No. 7,568,072.

(51) Int. Cl.
*G06F 12/00* (2006.01)
(52) U.S. Cl. ............... 711/133; 711/141; 711/E12.001; 711/E12.022
(58) Field of Classification Search ............. 711/133, 711/141, E12.001, E12.022
See application file for complete search history.

(56) References Cited

U.S. PATENT DOCUMENTS

2007/0055826 A1 3/2007 Morton et al.

OTHER PUBLICATIONS

U.S. Appl. No. 11/513,352, filed Aug. 31, 2006; Inventor: Begon et al.

*Primary Examiner* — Kevin L Ellis
*Assistant Examiner* — Mehdi Namazi
(74) *Attorney, Agent, or Firm* — Nixon & Vanderhye P.C.

(57) ABSTRACT

A method and data processing apparatus comprise a cache having a plurality of data entries; an eviction buffer comprising an information portion and a data portion; and eviction logic to transfer information associated with a first of the plurality of data entries from the cache to the information portion and to determine, with reference to the information, whether the first of the plurality of data entries should be written to a memory by examining the information. If it is determined that the data entry should be written to the memory, the eviction logic (1) transfers the information from the eviction buffer to a bus coupled with the memory, (2) transfers data of the first of the plurality of data entries from the cache to a data portion of the eviction buffer, (3) transfers information associated with a second of the plurality of data entries from the cache to the associated portion of the eviction buffer such that the data stored by the data portion of the eviction buffer corresponds to the first of the plurality of data entries and the information stored by the data portion of the eviction buffer corresponds to the second of the plurality of data entries, and (4) transfers the data stored by the data portion of the eviction buffer to the bus. This approach provides a low-power, high performance technique for handling eviction requests.

19 Claims, 4 Drawing Sheets

CACHE EVICTION

This application is a continuation of U.S. application Ser. No. 11/513,352, filed on Aug. 31, 2006, now U.S. Pat. No. 7,568,072, the entire content of which is hereby incorporated herein by reference in this application.

TECHNICAL FIELD

The present invention relates to the field of data processing. More particularly, the present invention relates to evicting data entries from caches.

BACKGROUND

In a data processing apparatus, a cache is typically provided to enable data stored in an external memory, which the processor regularly need to access, to be stored locally to the processor and thus accessed more quickly. Such caches are typically subject to size constraints and therefore the data which is stored therein should be judiciously selected.

Even with careful selection of the data to be stored in the cache, changing requirements of the processor will inevitably mean that occasionally new data will need to be put into the cache, and therefore that an existing entry in the cache will be overwritten. When such overwriting takes place it is typically necessary to check whether the data stored in the cache still corresponds to the original data in the external memory or whether it has changed. If the data stored in the cache has been altered whilst in the cache, and if that data may still be later needed by the processor, then it is typically necessary to take the stored data from the cache and update the corresponding data entry in the external memory. This is commonly known as an "eviction".

Typically, a data entry in a cache consists not only of the data itself, but is also accompanied by an indication of the memory address of the data (typically in an abbreviated format such as a "TAG"), and attributes indicating, for example, the validity of the data entry in the cache and whether the data entry in the cache has been modified since first being written to the cache. These attributes are commonly referred to as the "valid" bit and the "dirty" bit, respectively. When an allocation request to the cache occurs—a request to overwrite a data entry—the valid and dirty bits of the data entry selected to be overwritten are examined to determine if the data entry needs to be evicted.

In order to determine whether eviction is required without affecting the operation of the processor, it is known to provide an eviction buffer into which the selected cache data entry is transferred, so that the allocation may immediately proceed. Once in the eviction buffer, the valid and dirty bits are examined and if the data entry is "valid AND dirty", then the data entry is passed to an external bus to be returned to the external memory to update the original entry therein.

Given that there is a time cost to evicting data entries from the cache, in addition to a power cost due to reading out data from the cache, caching policies are typically optimised so that data evictions are relatively rare events. Various algorithms are known which attempt to make best use of a data cache, filling it with the data most useful to the processor and reducing the frequency with which data evictions occur. However, whilst such approaches help to improve the performance of the cache they still can exhibit a number of undesirable characteristics.

It is desired to provide an improved technique for cache eviction.

SUMMARY

A method of evicting a plurality of data entries from a cache comprises the steps of: transferring information associated with a first of the plurality of data entries from the cache to an information portion of an eviction buffer; determining if the first of the plurality of data entries should be written to a memory by examining the information; and if it is determined that the data entry should be written to the memory, transferring the information from the eviction buffer to a bus coupled with the memory and transferring data of the first of the plurality of data entries from the cache to a data portion of the eviction buffer, transferring information associated with a second of the plurality of data entries from the cache to the associated portion of the eviction buffer such that the data stored by the data portion of the eviction buffer corresponds to the first of the plurality of data entries and the information stored by the data portion of the eviction buffer corresponds to the second of the plurality of data entries, and transferring the data stored by the data portion of the eviction buffer to the bus.

The inventors recognized that although evictions from a cache are typically relatively rare events, indeed the algorithm that directs the operation of a data cache is typically explicitly constructed to keep data evictions as rare as possible, a situation may occur where evictions occur more often, for example when for initialising a region of memory. Accordingly, in this situation where several evictions may unavoidably be required in rapid succession there is a need to perform these evictions as efficiently as possible.

Although a fast "high performance" method of performing these evictions could be utilised in which a data entry comprising data and associated information is read into the eviction buffer in a single clock cycle, the inventors recognized that this method will typically waste power since the data entry will only need to be transferred to memory if the associated information indicates that this is necessary. Accordingly, if the data entry does not need to be transferred to memory, then energy has been expended reading the data from the cache for no reason.

Conversely, although a more energy efficient "low power" method of performing evictions could alternatively be utilised in which only the associated information is initially read to determine if the corresponding data entry should be transferred to memory and, only if it should, the data is then read from the cache and transferred to memory, the inventors recognized that this approach takes several clock cycles, which is of particular disadvantage when performing several evictions in rapid succession.

Accordingly, only the associated information is initially read from the cache into the information part of the eviction buffer. If it is then determined that the corresponding data entry should be evicted, then the information is put onto the bus and the data is read from the cache into the data part of the eviction buffer. Meanwhile, the associated information associated with another data entry in the cache which may need evicting can be read from the cache. Thus the situation arises where the information part of the eviction buffer contains information related to one data entry, whilst the data part of the eviction buffer contains the data item of a previous data entry. Then whilst the information part of the eviction buffer is examined to determine if the corresponding data entry needs evicting, the data item of the previous data entry may be put onto the bus.

It will be appreciated that this technique, like the "low power" method described above, saves power by only reading a data item from the cache into the eviction buffer when the corresponding data entry needs evicting, but also operates as fast as the "high performance" method described above, since a data item and a set of associated information may be read into the eviction buffer in one cycle. Accordingly, this technique advantageously benefits from both these methods by interleaving eviction requests.

In one embodiment, the method further comprises the step of: if it is determined that the data entry should not be written to the memory, preventing transferring of the information from the eviction buffer to the bus coupled with the memory, preventing transferring of data of the first of the plurality of data entries from the cache, and indicating that the information portion can be overwritten by the information associated with the second of the plurality of data entries.

Hence, in the event that an eviction does not need to occur, that data entry is prevented from being written to memory and the entry is marked as available to be overwritten without transferring the data portion to the eviction buffer.

In one embodiment, the eviction buffer comprises a single data portion and a single associated data portion.

In one embodiment, the eviction buffer comprises a data portion for storing data from only a single data entry and an information portion for storing information from only a single data entry.

In one embodiment, the eviction buffer comprises a data portion for storing data from a single data entry and an information portion for storing information from a different single data entry.

Evictions are, often by construction, relatively rare events and hence valuable space in a data processing apparatus may be saved by limiting the eviction buffer to be able to accommodate a single data portion and a single information portion. Hence, the eviction buffer can remain small and handle the eviction of up to two data entries simultaneously despite only a single entry in the eviction buffer being provided.

In one embodiment, the information comprises an indication of a memory address of that associated data entry.

Storing an indication of a memory address of a data entry, such as a TAG value formed from an upper portion of the memory address, enables the memory address to be stored in the cache in an advantageously shortened format, and yet fully reconstructed if the data entry is evicted.

In one embodiment, the information comprises an indication of a validity of that associated data entry.

Storing an indication of the validity of a data entry in the cache provides a simple mechanism for a processor to simply indicate that a particular data entry is no longer needed, for example by flipping the status of a "valid" bit from true to false.

In one embodiment, the information comprises an indication of whether that associated data entry has been modified since being written to the cache.

Storing an indication of whether a data entry has been modified since being written to the cache, for example a "dirty" bit, provides an indication of the coherency between the cache and the external memory for that data entry and thus whether the data entry might need evicting when its data line in the cache is overwritten.

It will be appreciated that the combination of a valid bit and a dirty bit provide a simple indication of whether a data entry in the cache should be evicted.

In one embodiment, the bus is operable to support split address and data transactions.

Hence, it is possible to take advantage of an external bus on which a data item and its memory address may be passed independently of each other, such as a bus adhering to the AMBA™ AXI interface specification of ARM Limited, Cambridge, UK.

In embodiments, the eviction buffer is part of a bus interface unit.

Whilst the skilled person will realize that the location of the eviction buffer is largely immaterial to its operation, it may conveniently form part of a bus interface unit which may typically be located between a cache controller and the external bus.

A data processing apparatus comprises a cache having a plurality of data entries; an eviction buffer comprising an information portion and a data portion; and eviction logic operable to transfer information associated with a first of the plurality of data entries from the cache to the information portion and to determine, with reference to the information, whether the first of the plurality of data entries should be written to a memory by examining the information, the eviction logic being further operable, if it is determined that the data entry should be written to the memory, to transfer the information from the eviction buffer to a bus coupled with the memory and to transfer data of the first of the plurality of data entries from the cache to a data portion of the eviction buffer, to transfer information associated with a second of the plurality of data entries from the cache to the associated portion of the eviction buffer such that the data stored by the data portion of the eviction buffer corresponds to the first of the plurality of data entries and the information stored by the data portion of the eviction buffer corresponds to the second of the plurality of data entries, and to transfer the data stored by the data portion of the eviction buffer to the bus.

An eviction unit comprises buffer means having an information portion and a data portion; and eviction control means for transferring information associated with a first of the plurality of data entries from a caching means to the information portion and to determine, with reference to the information, whether the first of the plurality of data entries should be written to a memory means by examining the information, the eviction control means also, if it is determined that the data entry should be written to the memory, being for transferring the information from the buffer means to a bus means coupled with the memory means and for transferring data of the first of the plurality of data entries from the cache means to a data portion of the buffer means, for transferring information associated with a second of the plurality of data entries from the cache means to the associated portion of the buffer means such that the data stored by the data portion of the buffer means corresponds to the first of the plurality of data entries and the information stored by the data portion of the buffer means corresponds to the second of the plurality of data entries, and for transferring the data stored by the data portion of the buffer means to the bus means.

The above, and other objects, features and advantages will be apparent from the following detailed description of illustrative embodiments which is to be read in connection with the accompanying drawings.

DETAILED DESCRIPTION

Figure 1:
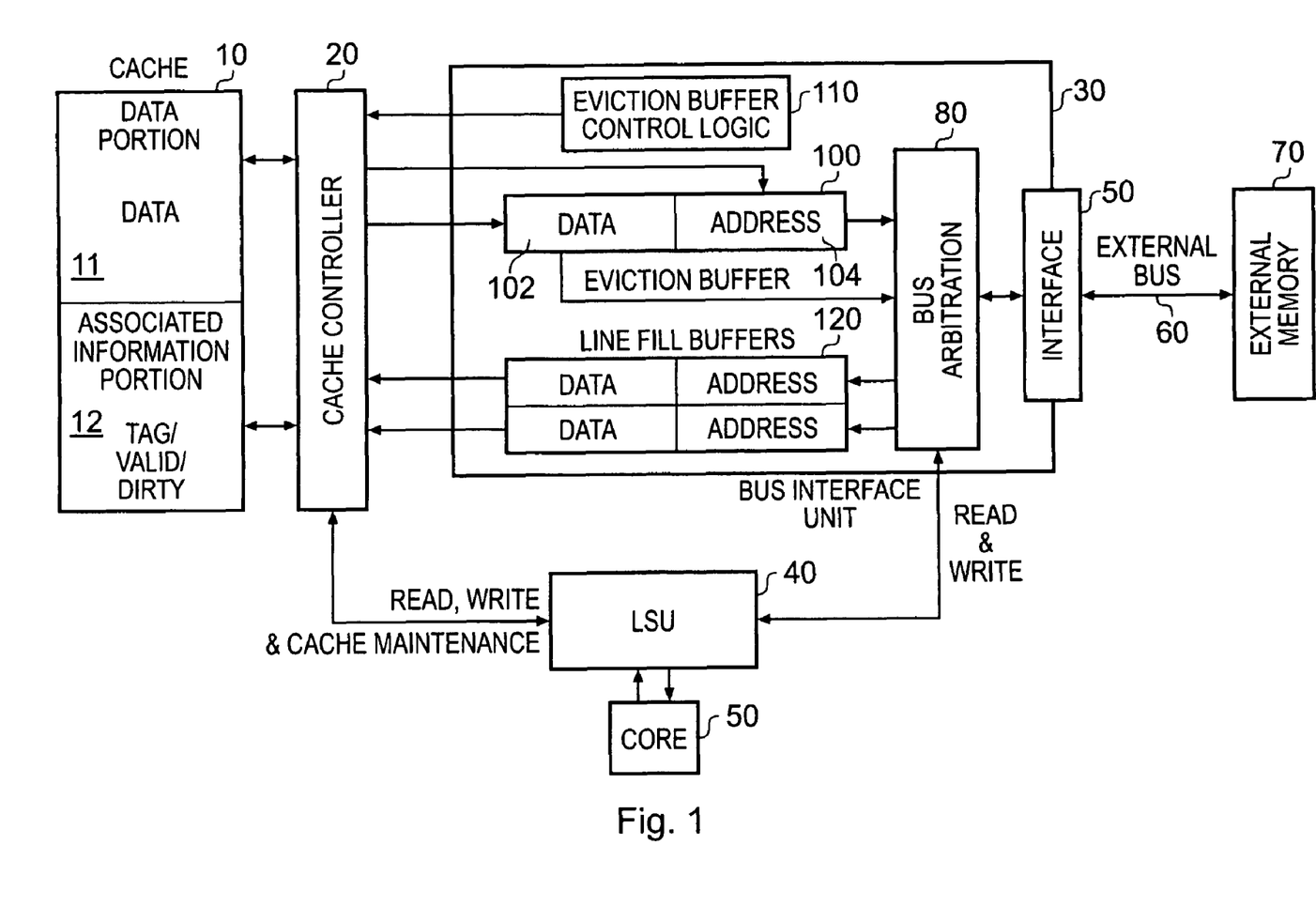
FIG. 1 is a schematic illustration of data processing system containing a bus interface unit.

FIG. 1 schematically illustrates a data processing apparatus according to an embodiment of the present invention containing a data cache 10, a cache controller 20, a bus interface unit 30, a load store unit (LSU) 40 and a processor core 50. The processor core 50 performs operations which may require access to data stored in an external memory device 70 accessed via the external bus 60. As discussed above, it is advantageous to store a set of data items from the external memory 70 in the data cache 10, which will be most commonly accessed by the processor core 50. The processor core 50 accesses both data stored in the data cache 10 and in the external memory 70 via LSU 40. The LSU 40 reads and writes data to and from the external memory 70 via bus arbitration unit 80 of the bus interface unit 30. The bus arbitration unit 80 puts data onto, and reads data from, the external bus 60 via interface 90. The LSU 40 also handles data accesses to and from the cache 10 via cache controller 20. Other signals such as for cache maintenance also go via this path.

The cache 10 is has two portions, a data portion 11 and an associated information portion 12. The data portion 11 stores the data items themselves, whilst the associated information portion 12 stores other information related to that data item such as an indication of the original memory address of that data item (typically in the form of a higher order portion of the address, known as TAG) as well as indications of the status of data items in the cache such as "valid" and "dirty". The state of these additional indicators are maintained by cache controller 20 and typically consist of two additional bits appended to a TAG value stored in the cache 10. Normally when a data item is placed in the cache 10 these status bits will initially indicate that data item is "valid" and "not dirty". Thereafter, as the processor core 50 continues its operations these status bits may be updated. For example, if the processor core 50 performs an operation which increments a data item in the cache 10 by some amount the data item's status will be switched to "dirty" to indicate that the coherency between the version of this data item stored in the cache 10 and the version of this data item stored in the external memory 70 has been lost. Alternatively, if the processor core 50 has been performing operations on a data item stored in the cache 10 and no longer requires that data item its status may be switched to "not valid".

In the example of FIG. 1, the bus interface unit 30 also contains an eviction buffer 100, eviction buffer control logic 110 and line fill buffers 120. Data items to be written to the cache 10 are received by the line fill buffers 120 from bus arbitration unit 80, where there are temporarily stored along with their corresponding address before being allocated to the cache 10. Before a pending data entry in a line fill buffer 120 can be allocated to the cache 10 the data entry currently occupying the location chosen for the pending data entry must potentially be evicted, in order to update the corresponding data item in the external memory 70. This takes place by the eviction buffer control logic 110 requesting the cache controller 20 to transfer the data entry from the cache 10 to the eviction buffer 100. There, under the direction of the eviction buffer control logic 110, the data entry is either evicted or not via the bus arbitration unit 80 and interface 90 to the external bus 60. The eviction buffer control logic 110 causes a data entry stored in the eviction buffer to be evicted if its corresponding status bits indicate that that data entry is both "valid" and "dirty".

Figure 2:
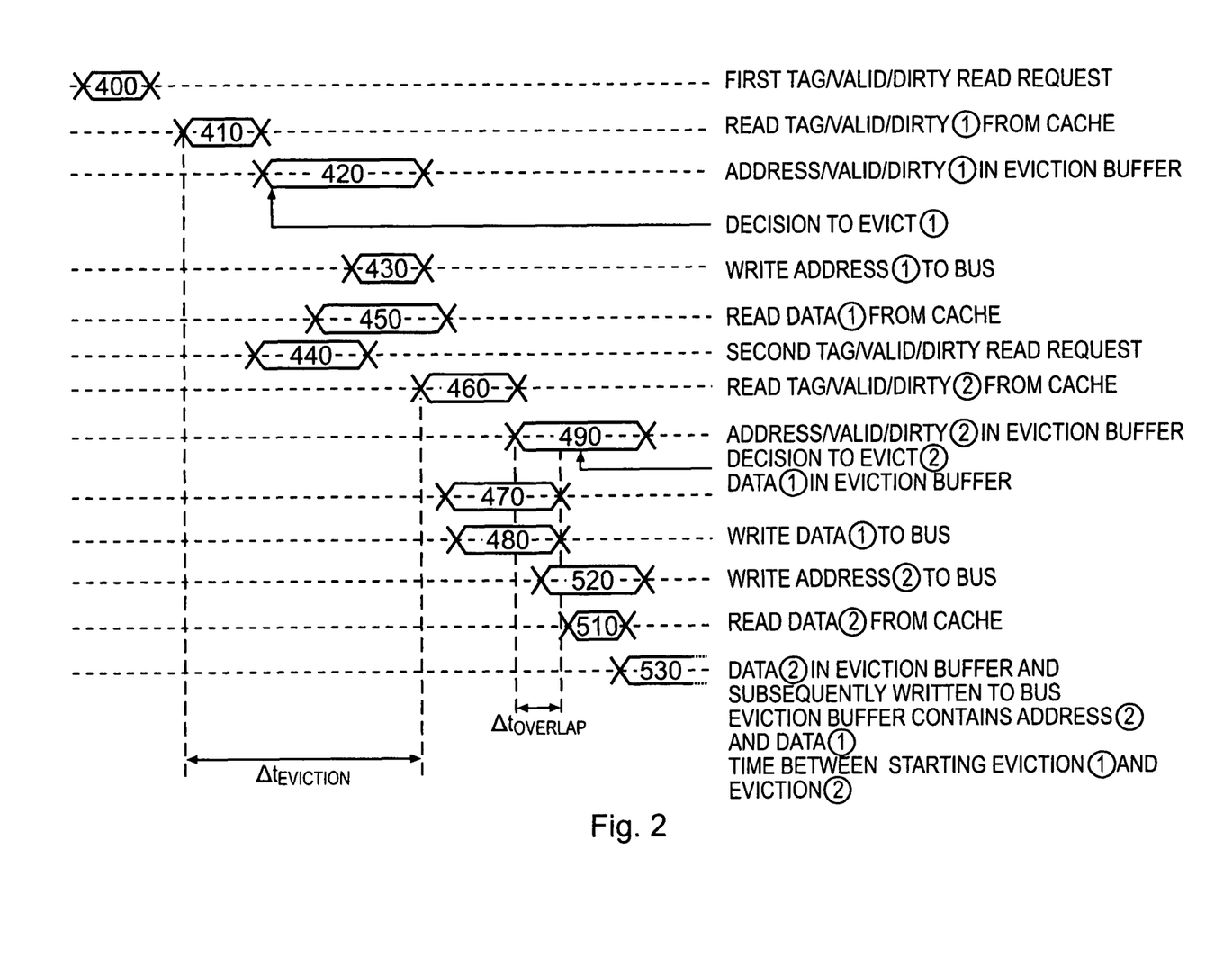
FIG. 2 is a schematic timing diagram illustrating the relative timing of operations bus interface unit of FIG. 1.

The operation and their relative timings of the bus interface unit 30 are schematically illustrated in FIG. 2. The timing of this diagram proceeds chronologically from left to right.

At stage 400, in response to a first eviction request, the eviction buffer control logic 110 sends a request to the cache controller 20 to read associated information from the cache 10.

At stage 410, at the cache controller 20 reads the associated information for a given data entry from associated information portion 12 and writes the corresponding address and status bits to the address portion 104 of the eviction buffer 100.

Then, as soon as the status bits are available in the eviction buffer (stage 420), the eviction buffer control logic 110 can determine whether the corresponding data entry in the cache 10 should be evicted.

If this data entry should be evicted (because its status bits indicate that it is both "valid" and "dirty"), then at the next available opportunity the address of this first data entry is passed to the bus arbitration unit 80 to be written to the bus (stage 430). Meanwhile, in the example of FIG. 2, a second eviction request has been received (stage 440) and is temporarily stalled.

The decision early in stage 420 to evict the first data entry also initiates, at the next available opportunity (stage 450), the data of this first data entry to be transferred from the data portion 11 of the cache 10 by the cache controller 20 to the data portion 102 of the eviction buffer 100.

Meanwhile, once stage 430 has been completed and the address corresponding to the first data entry has been passed to the bus arbitration unit 80, the eviction buffer control logic 110 signals to the cache controller 20 that it may begin reading the associated information corresponding to the second data entry from associated information portion 12 (stage 460). Also, at the conclusion of the stage 450, stage 470 begins with the data corresponding to the first data entry being in the eviction buffer 100.

At the next available opportunity, stage 480 begins where the data corresponding to the first data entry is passed to the bus arbitration unit 80.

Once stage 460 has completed then stage 490 begins where the address and status bits of the second data entry are in the eviction buffer 100. Hence there exists a period of time when the eviction buffer 100 simultaneously contains data corresponding to the first data entry and an address and status bits corresponding to a second data entry. In FIG. 2 this time period is labeled as $\Delta t_{OVERLAP}$.

As soon as the status bits of the second data entry are available in the eviction buffer (stage 490), the eviction buffer control logic 110 can determine whether the second data entry should be evicted or not.

If the second data entry should be evicted then the eviction buffer control logic 110 sends a request to cache controller 20 to read the data corresponding to the second data entry from data portion 11 of the cache and to transfer this data to the data portion 102 of the eviction buffer (stage 510). Meanwhile, the address corresponding to the second data entry can be passed from the eviction buffer 100 to the bus arbitration unit 80 (stage 520).

Once the reading of the data corresponding to the second data entry (stage 510) has completed, this data is available in the data portion 102 of the eviction buffer 100 and may subsequently be passed to bus arbitration unit 80 (stage 530).

If it determined that the data entry should not be evicted (because its status bits do not indicate that it is both "valid" and "dirty"), then the corresponding data from the data portion 11 will not be read, the address portion 104 may be overwritten by a subsequent request and data written to the relevant entry in the cache 10.

Figure 3:
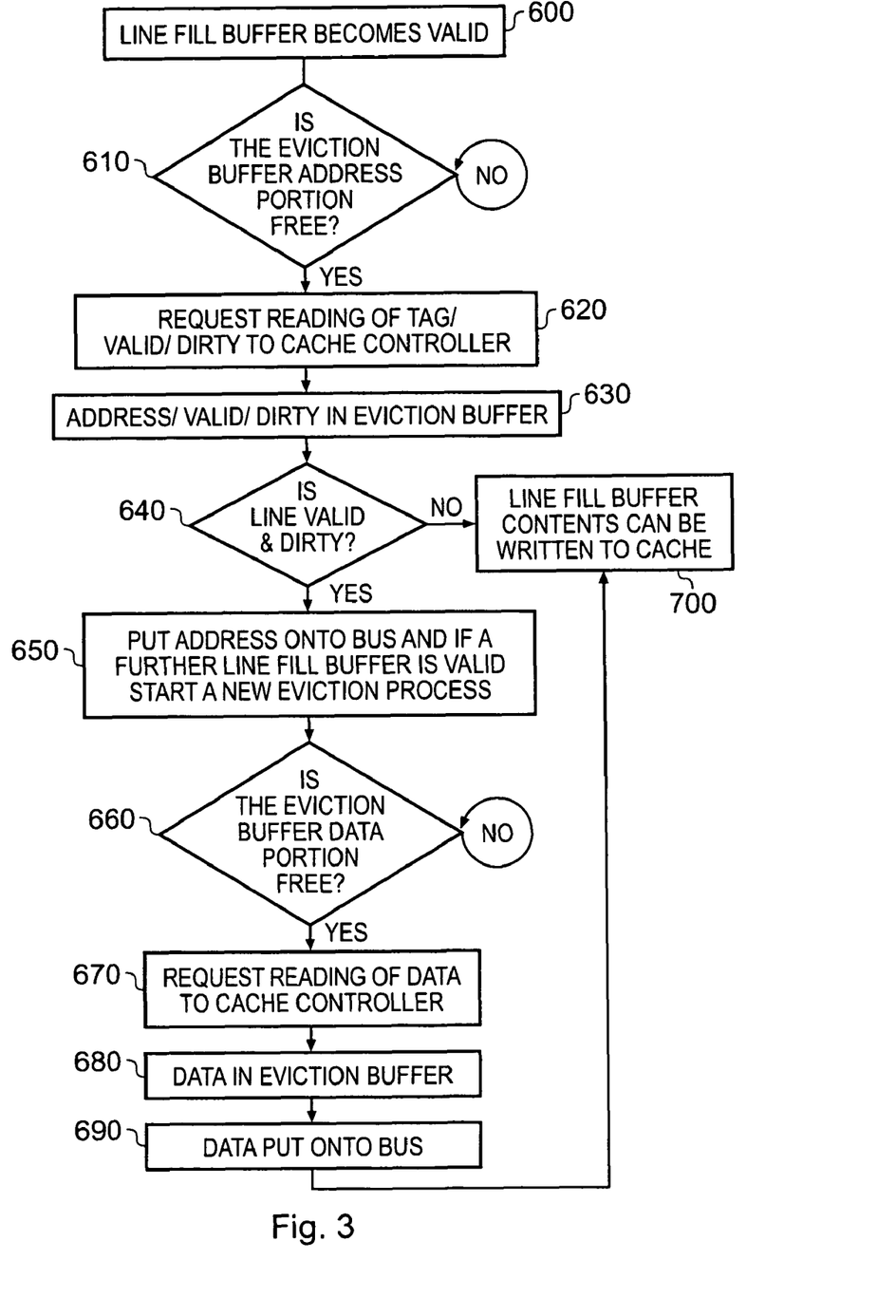
FIG. 3 is a flow diagram illustrating the sequence of operations of the bus interface unit of FIG. 1.

FIG. 3 is a flow diagram illustrating the operation of the bus interface unit 30. At step 600, a line of the line fill buffer 120 becomes valid, indicating that a cache allocation is required. At step 610, it is checked whether the address portion 104 of the eviction buffer 100 is available. If it is, then at step 620 the eviction buffer control logic 110 sends a request to the cache controller 20 to read the TAG and status bits of the data entry intended to be overwritten. The cache controller 20 then writes the corresponding address and "valid" and "dirty" status bits into the address portion 104 of the eviction buffer 100.

At step 630, once these have been written to the eviction buffer, it is established at step 640 if the status bits indicate that this data entry is both "valid" and "dirty". If either of these conditions is not met then the operational flow proceeds to step 700 and the contents of the pending line fill buffer 120 are transferred to the cache controller 20 which overwrites the chosen data entry. If, at stage 640, it is determined that the data entry is both "valid" and "dirty" then at step 650 the address in address portion 104 of the eviction buffer 100 is passed to bus arbitration unit 80 to be put on to the external bus 60, and if a further line fill buffer is valid, i.e. another allocation request is pending, then a new eviction process begins at step 600.

Then at step 660 it is checked whether the data portion 102 of the eviction buffer 100 is available and, when it becomes available, the flow proceeds to step 670 where the eviction buffer control logic 110 sends a request to the cache controller 20 to read the corresponding data from the cache data portion 11 and transfer it to data portion 102 of the eviction buffer 100. Once the data is in the eviction buffer (step 680) the data may be passed to bus arbitration unit 80 to be put onto the external bus 60 (step 690). Thereafter the flow proceeds to step 700 where the pending line fill buffer contents are written to the allocated line of the cache 10.

Figure 4A:
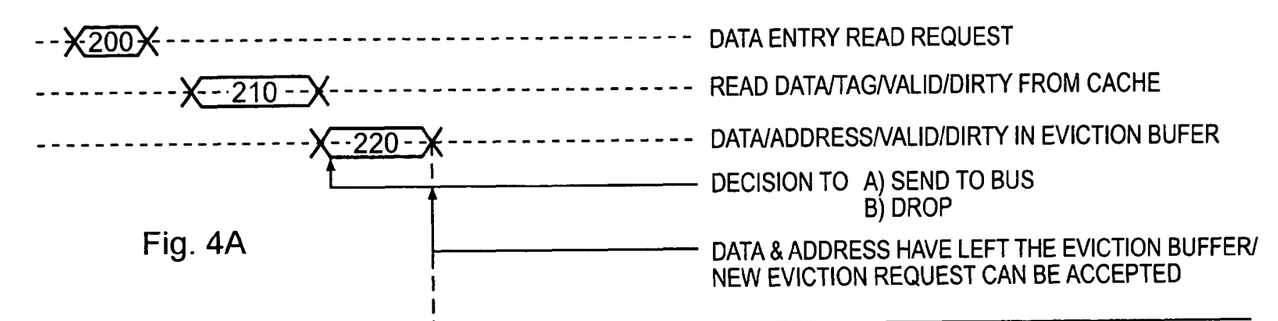
FIG. 4A is a schematic timing diagram illustrating the relative timing of operations according to a high performance eviction method.
Figure 4B:
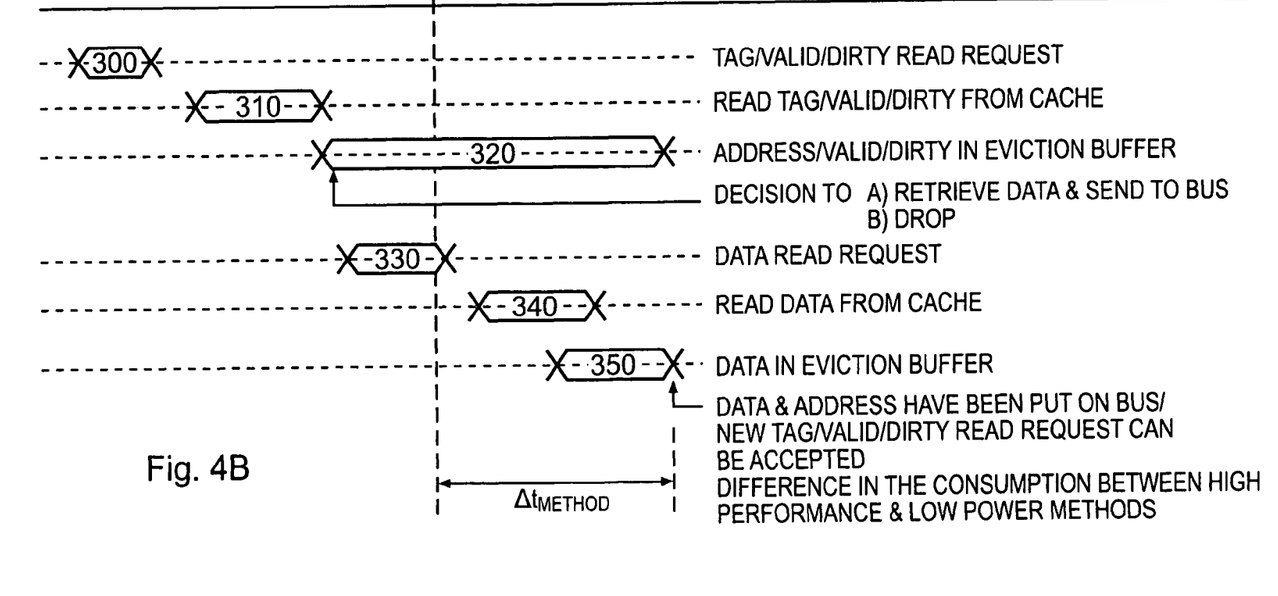
FIG. 4B is a schematic timing diagram illustrating the relative timing of operations according to a low power eviction method.

To illustrate the performance benefits of the approach discussed above, the steps and their relative timings of evicting a data entry from the cache according to a "high performance" method are schematically illustrated in FIG. 4A, whilst the steps and their relative timings of an alternative "low power" method of evicting data from the cache are schematically illustrated in FIG. 4B.

As shown in FIG. 4A, an eviction request begins by the eviction buffer control logic 110 sending a request to the cache controller 20 to read a data entry from the cache 10 and transfer it to the eviction buffer 100 (stage 200). Thereafter at the next available opportunity the cache controller 20 transfers data corresponding to the data entry from data portion 11 to the data portion 102 of the eviction buffer 100 and transfers the corresponding associated information from associated information portion 12 to the address portion 104 of the eviction buffer 100 (stage 210). Thus the eviction buffer 100 then contains the data of the data entry, the address of the data entry (reconstructed from the TAG and the index of the data entry in the cache) and the valid/dirty status bits. Then follows a stage 220 where all information about the data entry is in the eviction buffer 100. As soon as the status bits are available in the eviction buffer 100, the eviction buffer control logic 110 can make the decision whether to evict this data entry to the external memory 70 via the external bus 60, or not. The decision to evict the data entry is made if the status bits of the data entry indicate "valid" and "dirty". The eviction buffer control logic 110 then causes the eviction buffer 100 to transfer its contents to the bus arbitration unit 80. Once the data and address have left the eviction buffer a new eviction request can be accepted and a further data entry may be read from the cache 10 to the eviction buffer 100.

Whilst this "high performance" method of eviction data from the cache is fast, it suffers from the disadvantage that if early in stage 220 the decision is made not to evict this data entry (because it is either "not valid" or "not dirty" or both) then energy has been unnecessarily wasted in reading data from data portion 11 of the cache 10 into data portion 102 of the eviction buffer 100.

The steps and their relative timings of an alternative "low power" method of evicting data from the cache are schematically illustrated in FIG. 4B. The first stage 300 of this method involves eviction buffer control logic 110 sending a request to the cache controller 20 to transfer associated information from the associated information portion 12 of the cache 10 to the address portion 104 of the eviction buffer 100. Thereafter at the next available opportunity the cache controller reads the corresponding TAG and status bits from the associated information portion 12 of the cache and writes the corresponding address and status bits into the address portion 104 of the eviction buffer 100. Shortly after the status bits become available in the eviction buffer 100, the eviction buffer control logic 110 determines whether the corresponding data entry should be evicted or not, as in the previous method. If the data entry should be evicted, then at stage 330 the eviction buffer control logic 110 sends a request to the cache controller 20 to transfer the corresponding data from the data portion 11 of the cache to the data portion 102 of the eviction buffer 100. Once this transfer stage 340 has completed then the condition occurs where the corresponding address is in the eviction buffer (stage 320) and simultaneously the corresponding data is also in the eviction buffer (stage 350). Thereafter the eviction buffer control logic 110 causes both the data and address to be transferred to the bus arbitration unit 80 and a new eviction request can be accepted, i.e. a new read request for associated information can be sent from the eviction buffer control logic to the cache controller 20.

This method has the advantage that if early in stage 320 the decision is made to drop this data entry, then the remaining stages 330, 340 and 350 do not occur, correspondingly saving energy. This serial method (address, then data) of evicting data is however slower than the "high performance" method illustrated in FIG. 4A and the time difference between the two is illustrated by the time span $\Delta t_{METHOD}$ at the bottom of FIG. 4B.

Hence, it can be seen that the method of the present invention illustrated in FIG. 2 achieves the same time delay between initiating a first eviction and a second eviction as the high "performance" method illustrated in FIG. 4A. This time delay is labelled in FIG. 2 as $\Delta t_{EVICTION}$. Nevertheless, due to the sequential reading of the associated information and the data for a given data entry in the cache 10 (stages 410 and 450 for the first eviction and stages 460 and 510 for the second eviction in FIG. 2) the method of the present invention achieves the low power consumption of the method illustrated in FIG. 4B, since it will be appreciated that the data reads (450 and 510) need not take place unless their corresponding status bits indicate that it is necessary to evict the corresponding data entry. Referring to FIG. 2 it should be noted that although the reading of data and the reading of associated information from the cache 10 are sometimes illustrated as happening simultaneously these reads are independent and have no requirements to occur at the same time.

Hence, for an entry in the cache 10 which may need evicting, first the associated information comprising a memory address and status bits are transferred from the cache 10 to the address part 104 of the eviction buffer 100. Thereafter, only if the entry is determined to need eviction, is the corresponding data transferred from the cache 10 to the data part 102 of the eviction buffer 100, thus saving system power by not unnecessarily reading data from the cache 10. Furthermore, as soon as the need for eviction has been established the address is moved out of the eviction buffer 100 for transferal to the original memory location via the external bus 60. This frees the address portion 104 to accept a further cache entry memory address and status bits, even simultaneously with the data of the previous cache entry. Subsequent evictions may thus overlap with previous evictions, meaning that resources use is optimised and eviction speed improved, but without power wastage of unnecessary data reads from the cache 10.

Accordingly, it will be appreciated that the present technique realizes that the advantages of both the "high performance" and the "low power" eviction methods can be gained if the external bus 60 is configured such that the data and address of a particular data entry need not be transferred together on the bus 60, as is the case with an external bus constructed according to the AMBA™ AXI interface specification of ARM Limited of Cambridge, UK. In particular, this approach allows low power evictions according to the method illustrated in FIG. 4B to be performed, but interleaved such that the high performance of the method illustrated in FIG. 4A is also attained.

Although illustrative embodiments have been described in detail herein with reference to the accompanying drawings, it is to be understood that the claims are not limited to those embodiments, and that various changes and modifications can be effected therein by one skilled in the art without departing from the scope and spirit of the appended claims.

We claim:

1. A method of evicting a plurality of data entries from a cache, said method comprising the steps of:
   transferring information associated with a first of said plurality of data entries from said cache to an information portion of an eviction buffer;
   determining if said first of said plurality of data entries should be written to a memory by examining said information; and
   if it is determined that said data entry should be written to said memory,
   transferring said information from said eviction buffer to a bus coupled with said memory and transferring data of said first of said plurality of data entries from said cache to a data portion of said eviction buffer,
   transferring information associated with a second of said plurality of data entries from said cache to said information portion of said eviction buffer such that said data stored by said data portion of said eviction buffer corresponds to said first of said plurality of data entries and said information stored by said information portion of said eviction buffer corresponds to said second of said plurality of data entries, and
   transferring said data stored by said data portion of said eviction buffer to said bus.

2. The method as claimed in claim 1, wherein said eviction buffer comprises a single data portion and a single information portion.

3. The method as claimed in claim 1, wherein said eviction buffer comprises a data portion for storing data from only a single data entry and an information portion for storing information from only a single data entry.

4. The method as claimed in claim 1, wherein said eviction buffer comprises a data portion for storing data from a single data entry and an information portion for storing information from a different single data entry.

5. The method as claimed in claim 1, wherein said information comprises an indication of a memory address of that associated data entry.

6. The method as claimed in claim 1, wherein said information comprises an indication of a validity of that associated data entry.

7. The method as claimed in claim 1, wherein said information comprises an indication of whether that associated data entry has been modified since being written to said cache.

8. The method as claimed in claim 1, wherein said bus is arranged to support split address and data transactions.

9. The method as claimed in claim 1, wherein said eviction buffer is part of a bus interface unit.

10. A data processing apparatus comprising:
    a cache having a plurality of data entries;
    an eviction buffer comprising an information portion and a data portion; and
    eviction logic arranged to transfer information associated with a first of said plurality of data entries from said cache to said information portion and to determine, with reference to said information, whether said first of said plurality of data entries should be written to a memory by examining said information, said eviction logic being further arranged, if it is determined that said data entry should be written to said memory, to transfer said information from said eviction buffer to a bus coupled with said memory and to transfer data of said first of said plurality of data entries from said cache to a data portion of said eviction buffer, to transfer information associated with a second of said plurality of data entries from said cache to said information portion of said eviction buffer such that said data stored by said data portion of said eviction buffer corresponds to said first of said plurality of data entries and said information stored by said information portion of said eviction buffer corresponds to said second of said plurality of data entries, and to transfer said data stored by said data portion of said eviction buffer to said bus.

11. The data processing apparatus as claimed in claim 10, wherein said eviction buffer comprises a single data portion and a single information portion.

12. The data processing apparatus as claimed in claim 10, wherein said eviction buffer comprises a data portion for storing data from only a single data entry and an information portion for storing information from only a single data entry.

13. The data processing apparatus as claimed in claim 10, wherein said eviction buffer comprises a data portion for storing data from a single data entry and an information portion for storing information from a different single data entry.

14. The data processing apparatus as claimed in claim 10, wherein said information comprises an indication of a memory address of that associated data entry.

15. The data processing apparatus as claimed in claim 10, wherein said information comprises an indication of a validity of that associated data entry.

16. The data processing apparatus as claimed in claim 10, wherein said information comprises an indication of whether that associated data entry has been modified since being written to said cache.

17. The data processing apparatus as claimed in claim 10, wherein said bus is arranged to support split address and data transactions.

18. The data processing apparatus as claimed in claim 10, wherein said eviction buffer is part of a bus interface unit.

19. An eviction unit comprising:
   buffer means having an information portion and a data portion; and
   eviction control means for transferring information associated with a first of a plurality of data entries from a caching means to said information portion and to determine, with reference to said information, whether said first of said plurality of data entries should be written to a memory by examining said information, said eviction control means also, if it is determined that said data entry should be written to said memory, being for transferring said information from said buffer means to a bus means coupled with said memory and for transferring data of said first of said plurality of data entries from said cache means to a data portion of said buffer means, for transferring information associated with a second of said plurality of data entries from said cache means to said information portion of said buffer means such that said data stored by said data portion of said buffer means corresponds to said first of said plurality of data entries and said information stored by said information portion of said buffer means corresponds to said second of said plurality of data entries, and for transferring said data stored by said data portion of said buffer means to said bus means.

\* \* \* \* \*